United States Patent
Lee et al.

(10) Patent No.: US 12,265,942 B2
(45) Date of Patent: Apr. 1, 2025

(54) METHOD AND SYSTEM FOR AUTOMATIC REPLENISHMENT OF RETAIL ENTERPRISE STORE, AND COMPUTER-READABLE STORAGE MEDIUM

(71) Applicant: Starbucks Corporation, Seattle, WA (US)

(72) Inventors: Phoebe Chiachen Lee, Shanghai (CN); Gavin Lee, Shanghai (CN); Francky Fan, Shanghai (CN)

(73) Assignee: Starbucks Corporation, Seattle, WA (US)

(*) Notice: Subject to any disclaimer, the term of this patent is extended or adjusted under 35 U.S.C. 154(b) by 358 days.

(21) Appl. No.: 17/744,520

(22) Filed: May 13, 2022

(65) Prior Publication Data

US 2022/0374827 A1    Nov. 24, 2022

(30) Foreign Application Priority Data

May 17, 2021   (CN) .......................... 202110532323.5

(51) Int. Cl.
   *G06Q 10/087*   (2023.01)
   *G06F 17/12*    (2006.01)
   (Continued)

(52) U.S. Cl.
   CPC .......... *G06Q 10/087* (2013.01); *G06F 17/12* (2013.01); *G06F 17/16* (2013.01); *G06Q 30/0202* (2013.01)

(58) Field of Classification Search
   None
   See application file for complete search history.

(56) References Cited

U.S. PATENT DOCUMENTS

| | | | |
|---|---|---|---|
| 8,666,848 B1* | 3/2014 | Polsky ................... | G06Q 10/08 705/28 |
| 2004/0143486 A1* | 7/2004 | Yeow ................... | G06Q 10/087 705/28 |

(Continued)

FOREIGN PATENT DOCUMENTS

| | | | |
|---|---|---|---|
| CA | 2992181 A1 * | 7/2019 | ....... G06Q 10/06313 |
| CN | 105825354 A | 8/2016 | |

(Continued)

OTHER PUBLICATIONS

K.H. van Donselaar "Inventory replenishment in retail: The Efficient Full Service strategy", Jan. 2008, ResearchGate, pp. 1-13 (Year : 2008).*

(Continued)

*Primary Examiner* — Romain Jeanty
(74) *Attorney, Agent, or Firm* — Knobbe, Martens, Olson & Bear, LLP

(57) ABSTRACT

A method and system are disclosed for automatic replenishment of a retail enterprise store, and a computer-readable storage medium. In the method of the present disclosure, historical operational transaction data of at least one store of the same type as the retail enterprise store is used to obtain four indicators of each product of the at least one store, a plurality of target features having an impact on an indicator matrix composed of the four indicators are extracted to provide replenishment suggestions, and the indicator matrix composed of the four indicators is automatically adjusted to update a replenishment model. In the embodiments of the present disclosure, a set of algorithm models can be optimized and customized according to the historical operational transaction data of the store and external environments such as weather changes, business circle customer flow, discount events, etc., so that each store can be provided with SKU-level high-precision demand prediction and replenishment (Continued)

suggestions to generate replenishment suggestions, improving the processing efficiency of the server, and further realizing the artificially controllable intelligent replenishment decision-making function.

20 Claims, 8 Drawing Sheets

(51) Int. Cl.
*G06F 17/16* (2006.01)
*G06Q 30/0202* (2023.01)

(56) References Cited

U.S. PATENT DOCUMENTS

| | | | | |
|---|---|---|---|---|
| 2007/0260524 | A1* | 11/2007 | Young | G06Q 10/087 |
| | | | | 705/22 |
| 2009/0299779 | A1* | 12/2009 | Ettl | G06Q 20/203 |
| | | | | 705/28 |
| 2011/0264485 | A1* | 10/2011 | Notani | G06Q 10/06 |
| | | | | 705/28 |
| 2012/0253995 | A1* | 10/2012 | Boob | G06Q 30/0201 |
| | | | | 705/28 |
| 2014/0100768 | A1* | 4/2014 | Kessens | G05D 3/00 |
| | | | | 701/124 |
| 2014/0122180 | A1* | 5/2014 | Chan | G06Q 30/0202 |
| | | | | 705/7.31 |
| 2020/0013000 | A1* | 1/2020 | Wicker | H04L 67/1001 |
| 2021/0110413 | A1 | 4/2021 | Ouellet et al. | |
| 2021/0142384 | A1* | 5/2021 | Nori | G06N 5/01 |

FOREIGN PATENT DOCUMENTS

| | | | |
|---|---|---|---|
| CN | 107122928 | A | 9/2017 |
| CN | 108133339 | A | 6/2018 |
| CN | 108718333 | A | 10/2018 |
| CN | 108737179 | A | 11/2018 |
| CN | 108738117 | A | 11/2018 |
| CN | 108763506 | A | 11/2018 |
| CN | 108809838 | A | 11/2018 |
| CN | 108829378 | A | 11/2018 |
| CN | 108829588 | A | 11/2018 |
| CN | 108833261 | A | 11/2018 |
| CN | 108874562 | A | 11/2018 |
| CN | 108985691 | A | 12/2018 |
| CN | 109214559 | A | 1/2019 |
| CN | 109302422 | A | 2/2019 |
| CN | 109509030 | A | 3/2019 |
| CN | 109615184 | A | 4/2019 |
| CN | 109657152 | A | 4/2019 |
| CN | 109710340 | A | 5/2019 |
| CN | 109710703 | A | 5/2019 |
| CN | 109714538 | A | 5/2019 |
| CN | 109729001 | A | 5/2019 |
| CN | 109767024 | A | 5/2019 |
| CN | 109783085 | A | 5/2019 |
| CN | 109784524 | A | 5/2019 |
| CN | 109814873 | A | 5/2019 |
| CN | 109816313 | A | 5/2019 |
| CN | 109857350 | A | 6/2019 |
| CN | 109871289 | A | 6/2019 |
| CN | 109948333 | A | 6/2019 |
| CN | 109960521 | A | 7/2019 |
| CN | 109961165 | A | 7/2019 |
| CN | 109978208 | A | 7/2019 |
| CN | 109981611 | A | 7/2019 |
| CN | 109993334 | A | 7/2019 |
| CN | 110019401 | A | 7/2019 |
| CN | 110175804 | A | 8/2019 |
| CN | 110400103 | A | 11/2019 |
| CN | 110516998 | A | 11/2019 |
| CN | 111353127 | A | 6/2020 |
| CN | 111353624 | A | 6/2020 |
| CN | 111415027 | A | 7/2020 |
| CN | 111435472 | A | 7/2020 |
| CN | 115358651 | A | 11/2022 |
| EP | 4092592 | A1 | 11/2022 |
| WO | WO-0058891 | A1 * | 10/2000 ............. G06Q 10/06 |
| WO | WO-2005122076 | A2 * | 12/2005 ....... G06Q 10/06315 |
| WO | WO-2019161392 | A1 * | 8/2019 ........... G06Q 10/087 |

OTHER PUBLICATIONS

Taleizadeh et al."Stock replenishment policies for a vendor-managed inventory in a retailing system", May 2020, Journal of Retailing and Consumer Services, pp. 1-18 (Year: 2020).*

European Search Report for European Application No. 22173396.7 mailed on Sep. 27, 2022, in 9 pages.

* cited by examiner

METHOD AND SYSTEM FOR AUTOMATIC REPLENISHMENT OF RETAIL ENTERPRISE STORE, AND COMPUTER-READABLE STORAGE MEDIUM

CROSS-REFERENCE TO RELATED APPLICATION(S)

This application claims priority to Chinese Patent Application No. 202110532323.5 filed with the China National Intellectual Property Administration (CNIPA) on May 17, 2021 entitled "METHOD AND SYSTEM FOR AUTOMATIC REPLENISHMENT OF RETAIL ENTERPRISE STORE, AND COMPUTER-READABLE STORAGE MEDIUM" the disclosure of which is hereby incorporated by reference in its entirety. Furthermore, any and all priority claims identified in the Application Data Sheet, or any correction thereto, are hereby incorporated by reference under 37 C.F.R. § 1.57.

FIELD

The present disclosure relates to the technical field of management information systems, and more particularly to a method and system for automatic replenishment of a retail enterprise store and a computer-readable storage medium.

BACKGROUND

With the development of Internet e-commerce and the logistics industry, some new online retail industry trends such as self-service vending machines and "unmanned supermarkets" have gradually emerged on the market. These new retail industry trends generally rely on cloud computing, Internet of Things, mobile payment, big data and other technologies, and adopt unattended sales models to minimize labor costs and maintenance costs and improve user experience for consumers.

However, the existing online retail industry mainly relies on machine learning, including decision trees, neural networks and the like, in terms of store distribution, replenishment, and adjustment. The existing machine learning methods can only generate periodic replenishment demand prediction rather than continuous replenishment demand prediction. At the same time, the existing machine learning methods cannot generate continuous demand prediction at the level of a single commodity (also referred to as Stocking Keeping Unit, i.e. SKU). In addition, although the existing machine learning methods may use historical data as input, they usually do not consider external environmental factors (such as weather changes, business district customer flow, discount events, etc.) for preprocessing to generate features (i.e., data vectors), resulting in low prediction accuracy.

Therefore, improving the processing efficiency of the server and optimizing and customizing a set of algorithm models for each SKU in each store to generate replenishment suggestions are a major problem with which the online retail industry continues to grapple.

SUMMARY

An objective of the present disclosure is to provide a method for automatic replenishment of a retail enterprise store. The method for automatic replenishment of the retail enterprise store comprises: according to historical operational transaction data of at least one store of the same type as the retail enterprise store, obtaining an indicator matrix composed of at least four indicators of each product of the at least one store, wherein the historical operational transaction data includes at least one of inventory deduction data generated by sales, inventory increase data generated by purchasing, inventory scrap data or abnormal consumption data during sales, and profit and loss data generated by inventorying, and the at least four indicators include weighted mean absolute percentage error WMAPE, days of inventory DOI, demand fulfillment rate DFR and markout rate MOR of inventory; on the basis of the indicator matrix, determining an expected indicator range and a baseline of the product, and inputting a plurality of pieces of external data that are contemporaneous with the historical operational transaction data into a target feature extraction model, wherein the target feature extraction model extracts a plurality of target features having an impact on the indicator matrix composed of the at least four indicators on the basis of the external data and the expected indicator range; inputting the plurality of target features into a replenishment model in combination with the historical operational transaction data, wherein the replenishment model provides replenishment suggestions on the basis of a combination of the plurality of target features and the historical operational transaction data; and automatically adjusting the indicator matrix of the at least four indicators over time, and updating the replenishment model.

As an embodiment of the present disclosure, the determining the expected indicator range and the baseline of the product comprises: forming a coordinate system, the coordinate system comprising at least four coordinate axes, wherein each of the at least four coordinate axes represents one of the at least four indicators of the product, obtaining a mean value of each of the at least four indicators of the product in a plurality of stores, wherein the obtaining the mean value of each indicator comprises: calculating the mean value of each of the at least four indicators of the product in each of the plurality of stores in the same time period, screening out stores with at least one indicator of the at least four indicators of the product above the mean value from among the plurality of stores, and obtaining the highest value and the lowest value of the at least one indicator of the stores with the at least one indicator above the mean value, using a range of the highest value and the lowest value of each of the at least four indicators obtained between corresponding coordinate axes of the coordinate system as the expected indicator range, and for each of the at least four indicators, using a line connecting the mean values of the at least four indicators of the product of the plurality of stores obtained on the corresponding coordinate axis of the coordinate system as a baseline.

As an embodiment of the present disclosure, the WMAPE is calculated using the following formula:

$$WMPAE = \frac{\text{Sum of } \left|\frac{A(t)-P(t)}{A(t)}\right| * W(t)}{\text{Sum of } W(t)}$$

where A is an actual sales quantity, P is a predicted sales quantity, W(t) is a predicted weight at time t, and t is a discrete time point within the same time period;
the MOR is calculated using the following formula:

$$\text{markout rate} = \frac{\sum_{i \in sku} C_i * \text{markout\_quantity}_i}{\sum_{i \in sku} P_i * \text{sale\_quantity}_i}$$

where $\Sigma_{i \in sku} C_i *\text{markout\_quantity}_i$ is a sum of the product of unit costs C of scrapped products and scrap quantities in the same time period, and $\Sigma_{i \in sku} p_i *\text{sale\_quantity}_i$ is a sum of the product of sales prices P of the scrapped products and the scrap quantities in the same time period;

the DFR is calculated using the following formula:

$$\text{demand fill rate} = 1 - \frac{\sum_{i \in sku} p_i * \text{lost\_sale\_quantity}_i}{\sum_{i \in sku} p_i * \text{total\_demand}_i}$$

where $\Sigma_{i \in sku} p_i *\text{lost\_sale\_quantity}_i$ is a sum of unsold quantities of product i in the same time period, and $\Sigma_{i \in sku} p_i *\text{total\_demand}_i$ is a sum of total demand quantities for product i in the same time period; and the DOI is calculated using the following formula:

$$\text{days of coverage} = \frac{\sum_{i \in sku} p_i * \text{average\_stock}_i}{\sum_{i \in sku} p_i * \text{daily\_sales}_i}$$

where $\Sigma_{i \in sku} p_i *\text{average\_stock}_i$ is a sum of average stock quantities of product i in the same time period, and $\Sigma_{i \in sku} p_i *\text{daily\_sales}_i$ is a sum of daily sales quantities of product i in the same time period.

As an embodiment of the present disclosure, the determining the expected indicator range further comprises comparing the indicator matrix of the product of the at least one store with the baseline to obtain a score of the product of the at least one store in the same time period, and obtaining an indicator and an indicator distribution with the score meeting a threshold, and performing Gaussian fitting on the indicator distribution to obtain the expected indicator range.

As an embodiment of the present disclosure, Gaussian fitting is performed on the indicator distribution using the following formula to obtain a corresponding distribution equation:

$$y_i = y_{max} * e^{\left[-\frac{(x_i - x_{max})^2}{S}\right]}$$

and then a 2 σ range is obtained so as to obtain the expected indicator range;

where $y_{max}$ is a peak of a Gaussian curve, $X_{max}$ is a peak position, S is half-width information, and 2 σ is a 95% numerical hit interval.

As an embodiment of the present disclosure, the target feature extraction model extracting the plurality of target features having the impact on the indicator matrix composed of the at least four indicators on the basis of the external data and the expected indicator range comprises determining the inputted external data so that the indicator matrix composed of the at least four indicators falls within the expected indicator range and extracting the external data as a target feature, wherein the plurality of pieces of external data includes at least one of weather data, customer flow dynamics, and activity events, and wherein the target feature extraction model includes at least one of XGBoost, RF and LightGBM.

As an embodiment of the present disclosure, before inputting the plurality of pieces of external data that are contemporaneous with the historical operational transaction data into the target feature extraction model, the method further comprises: obtaining a plurality of primary features from the plurality of pieces of external data; performing dimensionality reduction processing on the plurality of primary features by using a principal component analysis method; obtaining a weight for each of the plurality of primary features; and inputting primary features with weights greater than a threshold among the plurality of primary features to the target feature extraction model as intermediate features.

As an embodiment of the present disclosure, the obtaining the weight for each of the plurality of primary features comprises dividing the plurality of primary features into a plurality of categories, and assigning a weight to each of the plurality of primary features, wherein the more primary features of the same category, the greater the weight of the primary features of the same category.

As an embodiment of the present disclosure, the inputting the plurality of target features into the replenishment model in combination with the historical operational transaction data and the replenishment model providing replenishment suggestions on the basis of the combination of the plurality of target features and the historical operational transaction data comprise: building a prediction model according to the combination of the plurality of target features and the historical operational transaction data; obtaining a predicted inventory demand from the prediction model; inputting the predicted inventory demand into the replenishment model; and providing the replenishment suggestions in combination with replenishment rules; wherein the replenishment rules include replenishment business rules and restrictions.

As an embodiment of the present disclosure, the updating the replenishment model comprises, in accordance with a preset cycle, updating the prediction model according to actual inventory consumption of the at least one store; recalculating the at least four indicators and the plurality of target features; and adjusting weights of the plurality of target features participating in demand prediction, wherein the adjustment is based on continuous improvement of the at least four indicators as a benchmark.

The present disclosure further provides a system for automatic replenishment of a retail enterprise store. The system comprises: a demand prediction module configured to, according to historical operational transaction data of at least one store of the same type as the retail enterprise store, obtain an indicator matrix composed of at least four indicators of each product of the at least one store, wherein the historical operational transaction data includes at least one of inventory deduction data generated by sales, inventory increase data generated by purchasing, inventory scrap data or abnormal consumption data during sales, and profit and loss data generated by inventorying, the at least four indicators include weighted mean absolute percentage error WMAPE, days of inventory DOI, demand fulfillment rate DFR and markout rate MOR of inventory; the demand prediction module is further configured to determine an expected indicator range and a baseline of the product on the basis of the indicator matrix, a feature extraction module configured to input a plurality of pieces of external data that are contemporaneous with the historical operational transaction data into a target feature extraction model, wherein the target feature extraction model extracts a plurality of target features having an impact on the indicator matrix composed of the at least four indicators on the basis of the external data and the expected indicator range; an intelligent replenishment module configured to input the plurality of target features into a replenishment model in combination with the historical operational transaction data, wherein the replenishment model provides replenishment suggestions on the basis of a combination of the plurality of target features and the historical operational transaction data; and a parameter update module configured to automatically adjust the indicator matrix of the at least four indicators over time, and to update the replenishment model.

As an embodiment of the present disclosure, the demand prediction module further comprises: a coordinate system building unit configured to form a coordinate system, the coordinate system comprising at least four coordinate axes, wherein each of the at least four coordinate axes represents one of the at least four indicators of the product; a target range determination unit configured to obtain a mean value of each of the at least four indicators of the product in a plurality of stores by calculating the mean value of each of the at least four indicators of the product in each of the plurality of stores in the same time period, screen out stores with at least one of the at least four indicators of the product above the mean value from among the plurality of stores, obtain the highest value and the lowest value of the at least one indicator of the stores with the at least one indicator above the mean value, and use a range of the highest value and the lowest value of each of the at least four indicators obtained between corresponding coordinate axes of the coordinate system as the expected indicator range; and a baseline determining unit configured to, for each of the at least four indicators, use a line connecting the mean values of the at least four indicators of the product of the plurality of stores obtained on the coordinate system as a baseline.

As an embodiment of the present disclosure, the WMAPE is calculated using the following formula:

$$WMPAE = \frac{\text{Sum of } \left|\frac{A(t) - P(t)}{A(t)}\right| * W(t)}{\text{Sum of } W(t)}$$

where A is an actual sales quantity, P is a predicted sales quantity, W(t) is a predicted weight at time t, and t is a discrete time point within the same time period;

the MOR is calculated using the following formula:

$$\text{markout rate} = \frac{\sum_{i \in sku} C_i * \text{markout\_quantity}_i}{\sum_{i \in sku} p_i * \text{sale\_quantity}_i}$$

where $\sum_{i \in sku} C_i *\text{market\_quantity}_i$ is a sum of the product of unit costs C of scrapped products and scrap quantities in the same time period, and $\sum_{i \in sku} p_i *\text{sale\_quantity}_i$ is a sum of the product of sales prices P of the scrapped products and the scrap quantities in the same time period;

the DFR is calculated using the following formula:

$$\text{demand fill rate} = 1 - \frac{\sum_{i \in sku} p_i * \text{lost\_sale\_quantity}_i}{\sum_{i \in sku} p_i * \text{total\_demand}_i}$$

where $\sum_{i \in sku} p_i *\text{lost\_sale\_quantity}_i$ is a sum of unsold quantities of product i in the same time period, and $\sum_{i \in sku} p_i *\text{total\_demand}_i$ is a sum of total demand quantities for product i in the same time period; and the DOI is calculated using the following formula:

$$\text{days of coverage} = \frac{\sum_{i \in sku} p_i * \text{average\_stock}_i}{\sum_{i \in sku} p_i * \text{daily\_sales}_i}$$

where $\sum_{i \in sku} p_i *\text{average\_stock}_i$ is a sum of average stock quantities of product i in the same time period, and $\sum_{i \in sku} p_i *\text{daily\_sales}_i$ is a sum of daily sales quantities of product i in the same time period.

As an embodiment of the present disclosure, the target range determination unit is further configured to compare the indicator matrix of the product of the at least one store with the baseline to obtain a score of the product of the at least one store in the same time period, obtain an indicator and an indicator distribution with the score meeting a threshold, and perform Gaussian fitting on the indicator distribution to obtain the expected indicator range.

As an embodiment of the present disclosure, the target range determination unit is further configured to perform Gaussian fitting on the indicator distribution using the following formula to obtain a corresponding distribution equation:

$$y_i = y_{max} * e^{\left[-\frac{(x_i - x_{max})^2}{S}\right]}$$

and then obtain a 2 σ range so as to obtain the expected indicator range;

where $y_{max}$ is a peak of a Gaussian curve, $X_{max}$ is a peak position, S is half-width information, and 2 σ is a 95% numerical hit interval.

As an embodiment of the present disclosure, the feature extraction module further comprises a feature determination unit configured to determine the inputted external data so that the indicator matrix composed of the at least four indicators falls within the expected indicator range and extract the external data as a target feature, wherein the plurality of pieces of external data includes at least one of weather data, customer flow dynamics, and activity events; and wherein the target feature extraction model includes at least one of XGBoost, RF and LightGBM.

As an embodiment of the present disclosure, the feature determination unit further comprises a data preprocessing subunit configured to obtain a plurality of primary features from the plurality of pieces of external data, perform dimensionality reduction processing on the plurality of primary features using a principal component analysis method to obtain a weight for each of the plurality of primary features, and input primary features with weights greater than a threshold among the plurality of primary features to the target feature extraction model as intermediate features.

As an embodiment of the present disclosure, the feature determination unit further comprises a feature weight update unit configured to divide the plurality of primary features into a plurality of categories and assign a weight to each of the plurality of primary features, wherein the more primary features of the same category, the greater the weight of the primary features of the same category.

As an embodiment of the present disclosure, the intelligent replenishment module comprises a replenishment prediction unit configured to build a prediction model according to the combination of the plurality of target features and the historical operational transaction data, obtain a predicted inventory demand from the prediction model, input the predicted inventory demand into the replenishment model, and provide the replenishment suggestions in combination with a replenishment constraint unit, wherein the replenishment constraint unit is configured to set replenishment business rules and restrictions.

As an embodiment of the present disclosure, the parameter update module comprises a replenishment model update unit configured to, in accordance with a preset cycle, update the prediction model according to actual inventory consumption of the at least one store; recalculate the at least four indicators and the plurality of target features; and adjust weights of the plurality of target features participating in demand prediction, wherein the adjustment is based on continuous improvement of the at least four indicators as a benchmark.

The present disclosure further provides a computer-readable storage medium, wherein a computer program is stored on the computer-readable storage medium, and when the computer program is executed by a processor, the method for automatic replenishment according to any one of the embodiments described above is implemented.

DETAILED DESCRIPTION

In order to enable a person skilled in the art to better understand the technical solutions of the present disclosure, as a non-limiting example, a method and system for automatic replenishment of a retail enterprise store and a computer-readable storage medium provided by the present disclosure are described below in detail with reference to the accompanying drawings.

Figure 1:
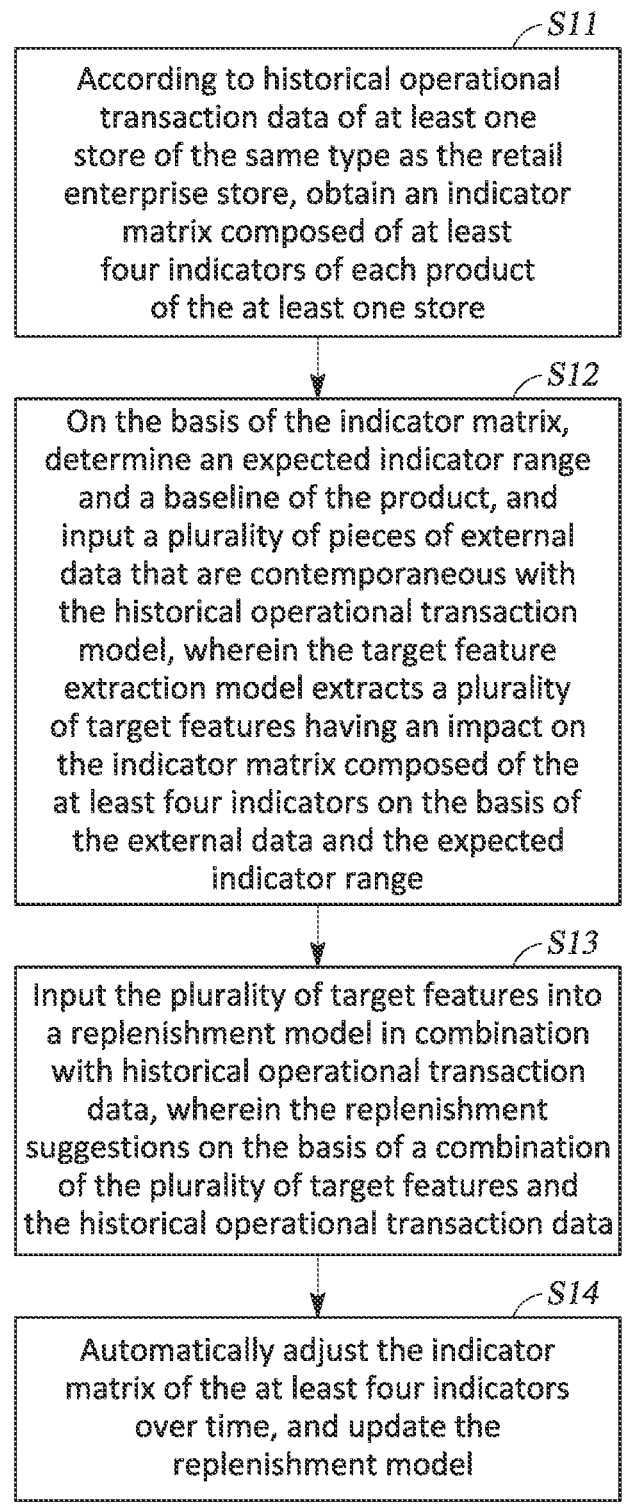
FIG. 1 is a flowchart of a method for automatic replenishment of a retail enterprise store according to an embodiment of the present disclosure.

FIG. 1 is a flowchart of a method for automatic replenishment of a retail enterprise store according to an embodiment of the present disclosure. As shown in FIG. 1, the method comprises steps S11 to S14.

In step S11, according to historical operational transaction data of at least one store of the same type as the retail enterprise store, an indicator matrix composed of at least four indicators of each product of the at least one store is obtained, wherein the historical operational transaction data includes at least one of inventory deduction data generated by sales, inventory increase data generated by purchasing, inventory scrap data or abnormal consumption data during sales, and profit and loss data generated by inventorying; and the at least four indicators include weighted mean absolute percentage error WMAPE, days of inventory DOI, demand fulfillment rate DFR and markout rate MOR of inventory.

In step S12, on the basis of the indicator matrix, an expected indicator range and a baseline of the product are determined, and a plurality of pieces of external data that are contemporaneous with the historical operational transaction data are input into a target feature extraction model, wherein the target feature extraction model extracts a plurality of target features having an impact on the indicator matrix composed of the at least four indicators on the basis of the external data and the expected indicator range.

In step S13, the plurality of target features are input into a replenishment model in combination with the historical operational transaction data, wherein the replenishment model provides replenishment suggestions on the basis of a combination of the plurality of target features and the historical operational transaction data.

In step S14, the indicator matrix of the at least four indicators is automatically adjusted over time, and the replenishment model is updated.

In step S11 described above, it should be known that the four indicators (KPIs) belong to a general standard for the industry to replenish inventory so as to measure the accuracy. According to inventory deduction generated by historical sales of the store, inventory increase generated by purchasing, inventory scrap or abnormal consumption during sales, and profit and loss generated by inventorying, KPIs for a predetermined time (e.g., every day) are generated. At the same time, the general standard for the industry to replenish inventory so as to measure the accuracy includes not only the above four indicators but also other types of KPIs. The "at least four indicators" defined in the present application are not intended to be the only limitation. Different enterprise stores may set "a plurality of indicators," "at least two indicators," "at least three indicators" or the like according to the actual situation. As an example of "at least two indicators," inventory deduction generated by historical sales of the store, inventory increase generated by purchasing, inventory scrap or abnormal consumption during sales, and profit and loss generated by inventorying may be included to generate a combination of any two indicators for a predetermined time (e.g., every day). As an example of "at least three indicators," inventory deduction generated by historical sales of the store, inventory increase generated by purchasing, inventory scrap or abnormal consumption during sales, and profit and loss generated by inventorying may be included to generate a combination of any three indicators for a predetermined time (e.g., every day).

Specifically, in step S12 described above, the expected indicator range and the baseline are determined in the following manner: forming a coordinate system, the coordinate system comprising at least four coordinate axes, wherein each of the at least four coordinate axes represents one of the at least four indicators of the product; obtaining a mean value of each of the at least four indicators of the product in a plurality of stores, wherein the obtaining the mean value of each indicator comprises: calculating the mean value of each of the at least four indicators of the product in each of the plurality of stores in the same time period; screening out stores with at least one indicator of the at least four indicators of the product above the mean value from among the plurality of stores, and obtaining the highest value and the lowest value of the at least one indicator of the stores with the at least one indicator above the mean value; using a range of the highest value and the lowest value of each of the at least four indicators obtained between corresponding coordinate axes of the coordinate system as the expected indicator range; and for each of the at least four indicators, using a line connecting the mean values of the at least four indicators of the product of the plurality of stores obtained on the corresponding coordinate axis of the coordinate system as a baseline.

Further, the specific calculation methods of the four indicators are as follows:

The WMAPE is calculated using the following formula:

$$WMPAE = \frac{\text{Sum of} \left| \frac{A(t) - P(t)}{A(t)} \right| * W(t)}{\text{Sum of } W(t)}$$

where A is an actual sales quantity, P is a predicted sales quantity, W(t) is a predicted weight at time t, and t is a discrete time point within the same time period;

the MOR is calculated using the following formula:

$$\text{markout rate} = \frac{\sum_{i \in sku} C_i * \text{markout\_quantity}_i}{\sum_{i \in sku} p_i * \text{sale\_quantity}_i}$$

where $\Sigma_{i \in sku} C_i *$market_quantity$_i$ is a sum of the product of unit costs C of scrapped products and scrap quantities in the same time period, and $\Sigma_{i \in sku} p_i *$sale_quantity$_i$ is a sum of the product of sales prices P of the scrapped products and the scrap quantities in the same time period;

the DFR is calculated using the following formula:

$$\text{demand fill rate} = 1 - \frac{\sum_{i \in sku} p_i * \text{lost\_sale\_quantity}_i}{\sum_{i \in sku} p_i * \text{total\_demand}_i}$$

where $\Sigma_{i \in sku} p_i *$lost_sale_quantity$_i$ is a sum of unsold quantities of product i in the same time period, and $\Sigma_{i \in sku} p_i *$total_demand$_i$ is a sum of total demand quantities for product i in the same time period; and the DOI is calculated using the following formula:

$$\text{days of coverage} = \frac{\sum_{i \in sku} p_i * \text{average\_stock}_i}{\sum_{i \in sku} p_i * \text{daily\_sales}_i}$$

where $\Sigma_{i \in sku} p_i *$average_stock$_i$ is a sum of average stock quantities of product i in the same time period, and $\Sigma_{i \in sku} p_i *$daily_sales$_i$ is a sum of daily sales quantities of product i in the same time period.

In order to more intuitively reflect the four KPI matrices and the expected indicator range and baseline described above, the present disclosure uses FIG. 2 to show a schematic diagram of an indicator matrix composed of four indicators of a product of a method for automatic replenishment of a retail enterprise store according to an embodiment of the present disclosure. In the figure, four coordinate axes represent weighted mean absolute percentage error WMAPE, days of inventory DOI, demand fulfillment rate (demand predicted accuracy) DFR, and markout rate MOR of inventory, respectively. It should be known that the continuous improvements of the four indicators in their respective positive directions represent an increase in the prediction accuracy (1-WMAPE), a decrease in days of inventory, an increase in the demand fulfillment rate, and a decrease in markout rate of inventory, respectively. As an example, the four KPI values WMAPE/DOI/DFR/MOR of the inner trapezoid in FIG. 2 are 32.15%, 7.07, 93.94% and 20.95%, respectively, which represent four KPI baselines (key performance indicator baselines) obtained through the above calculations.

Figure 2:
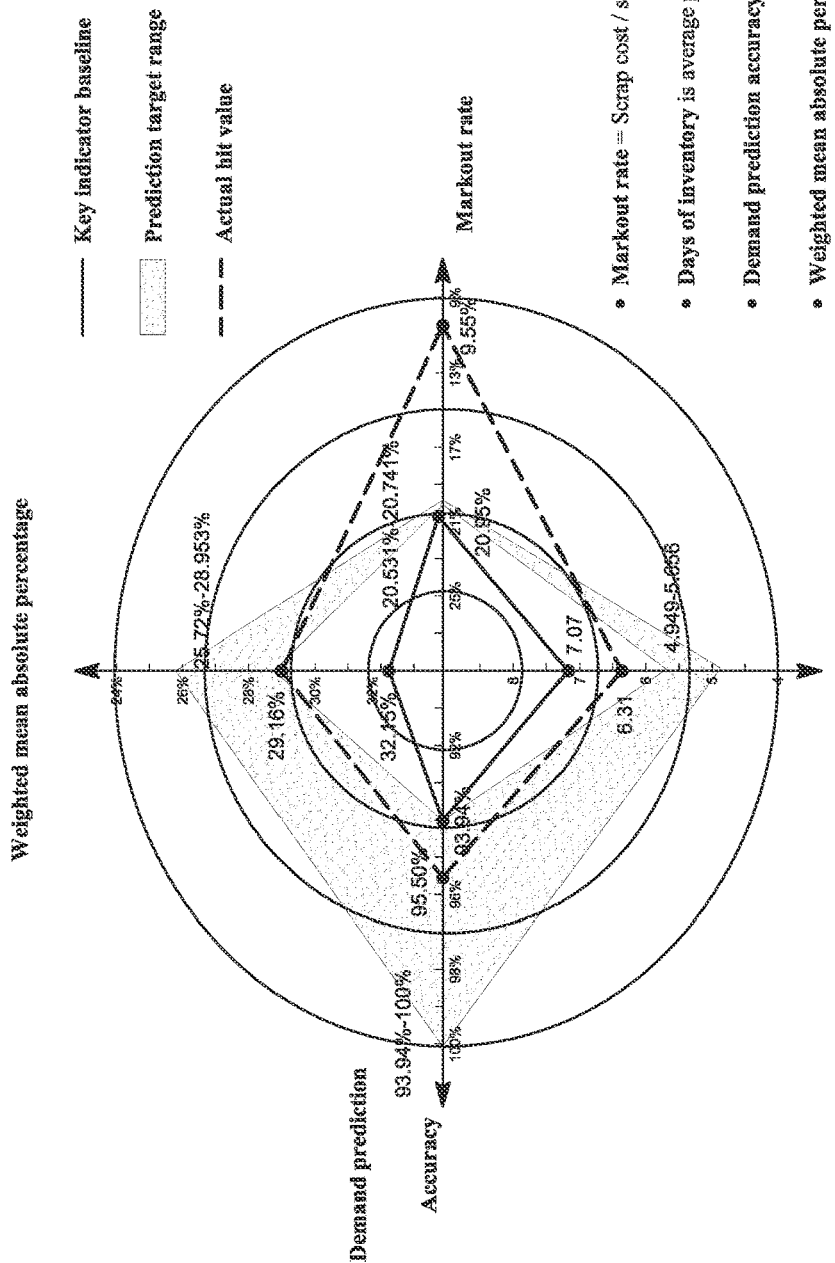
FIG. 2 is a schematic diagram of an indicator matrix composed of four indicators of a product in a method for automatic replenishment of a retail enterprise store according to an embodiment of the present disclosure.

In addition, FIG. 2 also shows an expected indicator range (predicted target range) obtained through the above calculations, and four KPI value ranges WMAPE/DOI/DFR/MOR of the expected indicator range are 25.72% to 28.953%, 4.949 to 5.656, 93.94% to 100% and 20.531% to 20.741%, respectively. An actual hit value is an indicator matrix composed of at least four indicators of a certain product of at least one store of the same type as the retail enterprise store that are obtained according to historical operational transaction data of the at least one store.

It should be known that the expected KPI target range will be continuously updated on the basis of the latest operational transaction data of the store, and an expected indicator range of each KPI can be obtained in real time, thereby obtaining continuous replenishment demand targets to provide continuous high-accuracy replenishment demands at the SKU level.

Further, as an embodiment of the present disclosure, determining the expected indicator range of the product further comprises: comparing the indicator matrix of the product of the at least one store with the baseline to obtain a score of the product of the at least one store in the same time period and obtaining an indicator and an indicator distribution with the score meeting a threshold, wherein the threshold may be stores with scores ranked in the top 20%, and performing Gaussian fitting on the indicator distribution to obtain the expected indicator range, wherein the indicator distribution includes a distribution of each of the four indicators described above. Gaussian fitting is performed on indicator distribution using the following formula to obtain a corresponding distribution equation:

$$y_i = y_{max} * e^{\left[ -\frac{(x_i - x_{max})^2}{S} \right]}$$

and then a 2 σ range is obtained so as to obtain the expected indicator range;

where $y_{max}$ is a peak of a Gaussian curve, $X_{max}$ is a peak position, S is half-width information, and 2 σ is a 95% numerical hit interval.

The steps of calculating the expected indicator range comprise: first, performing the above calculations on the indicators of the store, and after calculating indicator data in a certain time period, fitting an indicator distribution (performing Gaussian fitting) so as to obtain a fluctuation range and deduce a more reasonable and stable expected indicator range.

Specifically, the same time period can be in units of hour/day/week/month. As an example of "score of the product of at least one store in the same time period," 4 KPIs of each SKU of the store in the past 1 year are reviewed for the store on a weekly basis, the 4 KPIs of each SKU are compared with the baseline, and the product is scored on the basis of the comparison results. For example, a store with 4 KPIs of each SKU higher than the baseline is given a high score, and a store with 4 KPIs of each SKU lower than the baseline is given a low score. The scoring method may adopt a scoring and ranking algorithm commonly used in the prior art to obtain the scores of the stores in the most recent year.

Specifically, in step 12 described above, the target feature extraction model extracting the plurality of target features having the impact on the indicator matrix composed of the at least four indicators on the basis of the external data and the expected indicator range comprises determining the inputted external data so that the indicator matrix composed of the at least four indicators falls within the expected indicator range and extracting the external data as a target feature, wherein the plurality of pieces of external data includes at least one of weather data, customer flow dynamics, and activity events, and wherein the target feature extraction model includes at least one of XGBoost, RF and LightGBM.

As an embodiment of the present application, before inputting the plurality of pieces of external data that are contemporaneous with the historical operational transaction data into the target feature extraction model, the method further comprises: obtaining a plurality of primary features from the plurality of pieces of external data; performing dimensionality reduction processing on the plurality of primary features using a principal component analysis method; obtaining a weight for each of the plurality of primary features; and inputting primary features with weights greater than a threshold among the plurality of primary features to the target feature extraction model as intermediate features.

Figure 3:
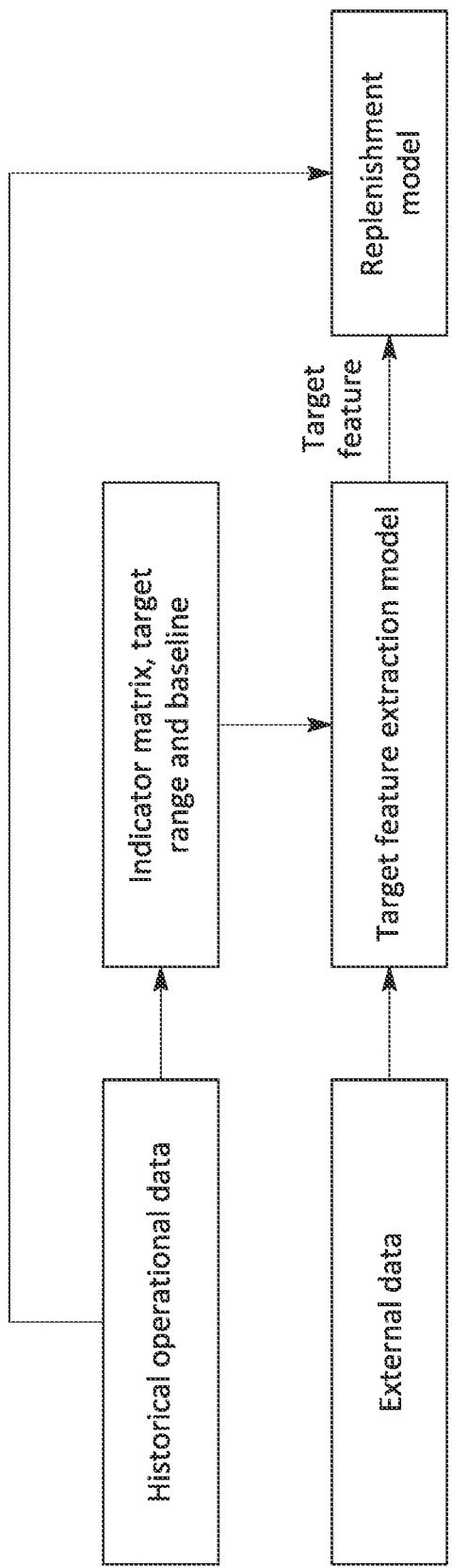
FIG. 3 is a flowchart of a method for extracting target features according to an embodiment of the present disclosure.

As an embodiment of the present application, FIG. 3 shows a flowchart of a method for extracting target features of the present application. A specific process is as follows: a plurality of pieces of external data (such as weather data, customer flow dynamics and activity events) are preprocessed to obtain a plurality of primary features; a principal component analysis method is used to perform dimensionality reduction processing on the plurality of primary features to amplify the weights of the plurality of primary features; the primary features whose weights are greater than a threshold are extracted as intermediate features; and the intermediate features are input into a target feature extraction model to further extract target features so that the indicator matrix composed of the four indicators falls within the expected indicator range.

As an embodiment of the present application, obtaining the weight for each of the plurality of primary features comprises dividing the plurality of primary features into a plurality of categories and assigning a weight to each of the plurality of primary features, wherein the more primary features of the same category, the greater the weight of the primary features of the same category.

As an embodiment of the present application, if any piece of the above external data has an impact on the replenishment result deduced by the algorithm within the expected indicator range, then the external data is marked as a target feature. The more the marked features of the same category, the greater the weight that participates in the operation. Predicted values will also be verified by actual values over time, and also in the verification process, the features will be substituted to verify whether a certain feature is not generated during the prediction process, or participates in the adjustment of the weight of the calculation factor in the adjustment model, so as to ensure that the continuous optimal level is achieved. This process is to make an actual comparison in terms of four indicator parameters on the basis of data predicted by the algorithm in combination with actual replenishment data drawn from real events. Thus, the automatic adjustment of the weights of the target features participating in the operation of the model is continuously and actively realized.

Data dimensionality reduction is actually a reduction of a plurality of pieces of input external data. Generally speaking, when a plurality of primary features have been obtained through early data processing, the plurality of primary features are not directly input into a target feature extraction model (for example, XGBoost, RF, and LightGBM). The main reasons are as follows. First, there may be a linear or nonlinear relationship between some primary features, and if all primary features are input into the model, the precision and accuracy of the target feature extraction model may be affected. Second, the number of pieces of data for the plurality of primary features may be too large compared to model presetting, which does not meet the requirements of some target feature extraction models. For example, if the number of pieces of preset data is 100, and the number of primary features is 200, then most models will report an error, reminding that there are too many primary features. Therefore, due to the above reasons, and at the same time, in order to better understand the data and obtain the information of the data, some data dimensionality reduction methods are usually used to reduce the number of primary features to a certain extent to obtain the target features, so that the target features with stronger explanatory power are generated as much as possible on the premise of not losing most of the information, and unnecessary features are removed at the same time. Principal Component Analysis (PCA) is one of the most commonly used methods for data dimensionality reduction, which achieves the purpose of data compression and explaining variables (features) mainly by means of linear transformation. For specific methods of principal component analysis, please refer to the prior art. In the present application, dimensionality reduction processing is performed on the plurality of primary features through a principal component analysis method to amplify the weights of the plurality of target features.

As an embodiment of the present application, in the case of few parameters, a grid search method may generally be used to optimize the parameters of the target feature extraction model. However, in the case of a large number of parameters, a Bayesian optimization method may be used to achieve a more reasonable optimization of the parameters of the target feature extraction model. Bayesian optimization is a very effective global optimization algorithm, and its goal is to find a global optimal solution in the algorithm. In the present disclosure, the parameters of the model are automatically optimized using the Bayesian optimization method. That is, optimal parameters are continuously iterated to update the parameters of the target feature extraction model. Bayesian optimization methods are widely used in design decision-making problems. By designing appropriate probability models and acquisition functions, an ideal solution can be obtained after only a few evaluations of the objective function, which is very suitable for optimization problems of large-scale users, complex software systems, and large-scale heterogeneous computing and distributed storage architectures. As an example of the present application, a parameter list of a Bayesian optimization target feature extraction model XGBOOST includes but is not limited to: 'max_depth': maximum tree depth; 'gamma': minimum loss function drop value required for node splitting; 'min_child_weight': minimum leaf node sample weight sum; 'max_delta_step': maximum step size; 'subsample': proportion of random sampling for each tree; and 'colsample_bytree': proportion of the number of columns randomly sampled for each tree. As an example, the process of target feature extraction of the present disclosure is realized through feature engineering. The feature engineering is to simultaneously perform batch processing on a plurality of features (for example, external data subjected to data preprocessing) on the basis of machine learning capabilities, including using historical sales and inventory dynamics of the store in combination with customer flow dynamics in and around the store, activity events (promotions within the store itself and promotions, exhibitions, sports events, concerts meetings, courses, etc. within 500 meters, 500 to 1,000 meters, 1,000 to 1,500 meters around the geofence of the store), historical weather data and real-time dynamic big data. On the basis of the target feature extraction model, correlation coefficients between hourly sales of each SKU in each store and factors affecting the inventory dynamics (for example, weights affecting the inventory demand prediction) are exhaustively enumerated to automatically extract impact factors (for example, target features) of the inventory consumption. For example, statistical analysis is performed on the response to historical increases/decreases in sales or consumption of a certain SKU in a certain store under extreme weather conditions. Statistical methods are exponentially weighted moving average based on time windows, linear regression slope indicator of sales trend, and volatility of sales trend.

Further, as an embodiment of the present disclosure, the extracting the plurality of target features having the impact on the indicator matrix composed of the four indicators comprises: aggregating a plurality of pieces of external data at a predetermined time (for example, a hour); exhaustively enumerating correlation coefficients between the sales of the product in each store in units of the predetermined time (for example, an hour) and a plurality of pieces of external data having an impact on inventory consumption (for example, weights affecting the inventory demand prediction); and deducing an optimal order value of the store in a sand table deduction method to automatically extract external data (for example, target features) having the impact on inventory consumption from the plurality of pieces of external data. It should be noted that the above sand table deduction method is still based on inputting data from different sources into the same target feature extraction model to extract features by relying on an algorithm and then to provide corresponding replenishment suggestions in combination with the optimal prediction results based on the four indicators. As an example of the present application, the sand table deduction method is to obtain a demand-predicted value for the historical data by substituting historical data into multiple groups of model strategies (i.e., a plurality of prediction models) that have been screened out, and to derive suggested quantification. An optimal model strategy is selected by comparison in terms of the prediction accuracy on the basis of the historical suggested quantification and the actual consumption of historical data. For example, a store is in an office building, and one day the weather forecast is that the temperature is 22 degrees and the weather is sunny. The historical inventory consumption in the same period is 30, and it is deduced by substituting it into the model that the inventory consumption of the store is 29. Therefore, the suggested order quantity is 29. By comparison with the historical inventory consumption of the next day, the actual occurrence value is 29, thereby indicating that it is the optimal model strategy. If the result is not 29, it is substituted into other prediction models for calculation, so as to finally obtain an optimal model.

In the above embodiment, the extraction of target features is combined with historical weather data in the same period, customer flow dynamics, activity events and other external data. All data are aggregated at a predetermined time (for example, one hour), and the optimal order value of the store is deduced by means of sand table deduction. Moreover, data that positively respond to the above four KPIs of the store (for example, increases or decreases in the KPI value) are obtained and classified as factors (i.e., features). For example, the inventory consumption of store A was decreased and the inventory scrap was increased due to every rainstorm in history. Therefore, the rainstorm will be defined as a feature. That is, the rainstorm is a factor for the sudden decrease in the inventory sales quantity of the store. After a model is generated, the model will define that store A should order less when it encounters a rainstorm. In the same way, for example, the inventory consumption of store B was increased due to every rainstorm in history. Then, the rainstorm is defined as a feature. That is, the rainstorm is a factor for the sharp increase in the inventory sales quantity of the store. After a model is generated, the model will define that store A should order more when it encounters a rainstorm. Then, in combination with the specific weather or other event factors encountered in the area where store A is located, stores with the same customer flow dynamics and events in the area will also be automatically classified as inventory consumption affected by this feature. Then, when there are new stores of the same type in the same area, the new stores will also inherit the feature of the area by default.

the present application realizes the optimization of computing resources. Specifically, by performing target feature selection on a plurality of pieces of external data, it is determined that only effective target features are involved in the prediction model for predictive analysis. Therefore, the computing efficiency and processing speed will be in an optimal state.

In step S13, inputting the plurality of target features into a replenishment model in combination with the historical operational transaction data and the replenishment model providing replenishment suggestions on the basis of the combination of the plurality of target features and the historical operational transaction data comprise: building a prediction model according to the combination of the plurality of target features and the historical operational transaction data; obtaining a predicted inventory demand from the prediction model; inputting the predicted inventory demand into the replenishment model, and providing the replenishment suggestions in combination with replenishment rules, wherein the replenishment rules include replenishment business rules and restrictions.

Figure 4:
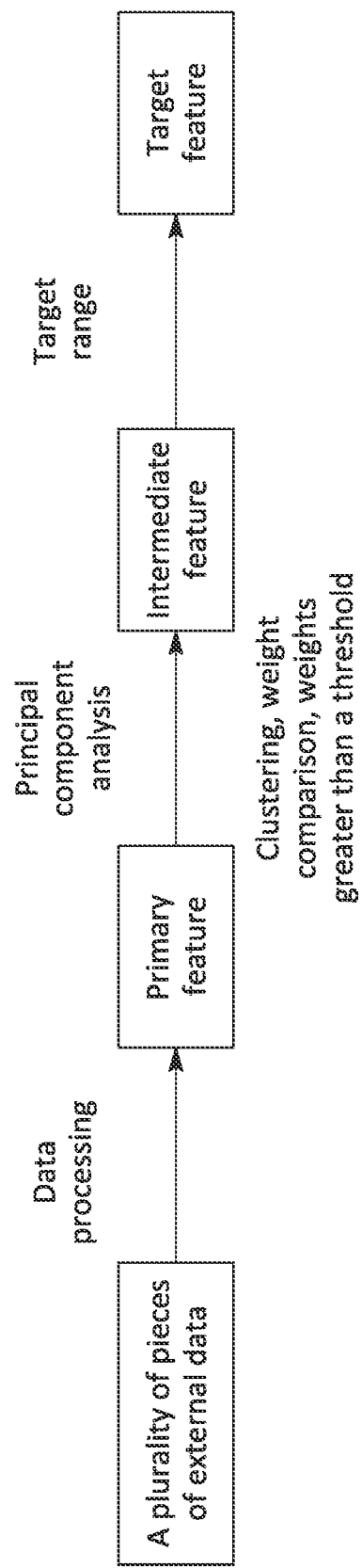
FIG. 4 is a flowchart of a method for automatic replenishment of a retail enterprise store according to an embodiment of the present disclosure.

As an embodiment of the present application, FIG. 4 is a flowchart of a method for automatic replenishment of a retail enterprise store according to the present disclosure. Specifically, the method comprises the following steps: obtaining an indicator matrix composed of four indicators of a product through historical operational data (for example, inventory deductions generated by sales, inventory increases generated by purchasing, inventory scrap or abnormal consumption during sales, and profit and loss generated by inventorying); determining an expected indicator range and a baseline of the product; further, inputting a plurality of pieces of external data into a target feature extraction model on the basis of a combination of a target range and the baseline to extract target features; and inputting the extracted target features into a replenishment model in combination with the historical operation data, so as to further provide replenishment suggestions.

As an example of inputting the target features into the replenishment model in combination with the historical operational transaction data to provide a suitable replenishment suggestion, a store is in an office building, and in the past 2 years, the temperature was 10 to 25 degrees, and the average sales quantity of food was 30. The sales quantity of food on sunny days was 28, and the average sales quantity of food on rainstorm/windy days was 40. The weather forecast shows that the temperature will be 22 degrees tomorrow and the weather will be sunny. A sales predicted value of food for that day is thus 30. For the same store, if the store is registered for a special event such as a building fire drill, by looking back in history, the event affected the quantity of sales down to 50%. The sales predicted value for that day is thus 14.

Figure 5:
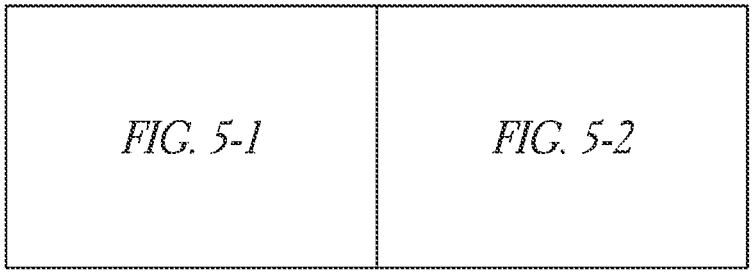
FIG. 5 (which includes FIGS. 5-1 and 5-2) is a flowchart of a method for automatic replenishment of a retail enterprise store according to an embodiment of the present disclosure.
Figure 5:
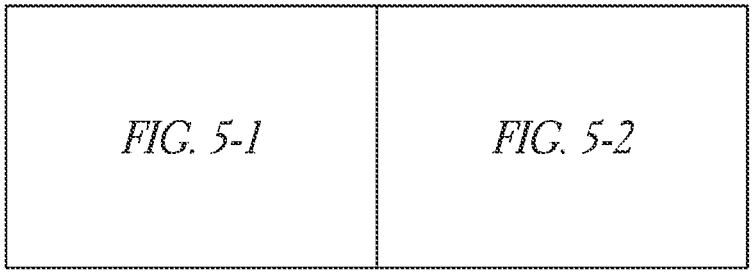
Figure 5:
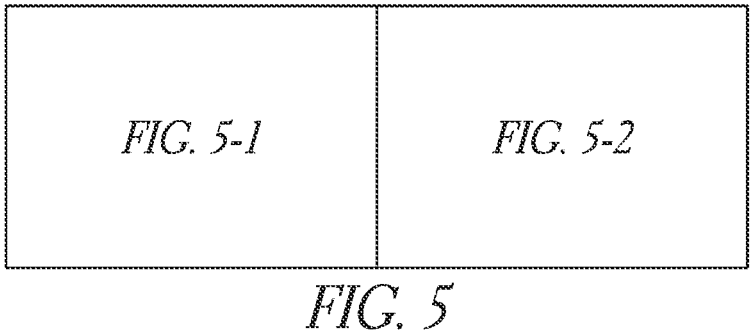
Figures 1, 5:
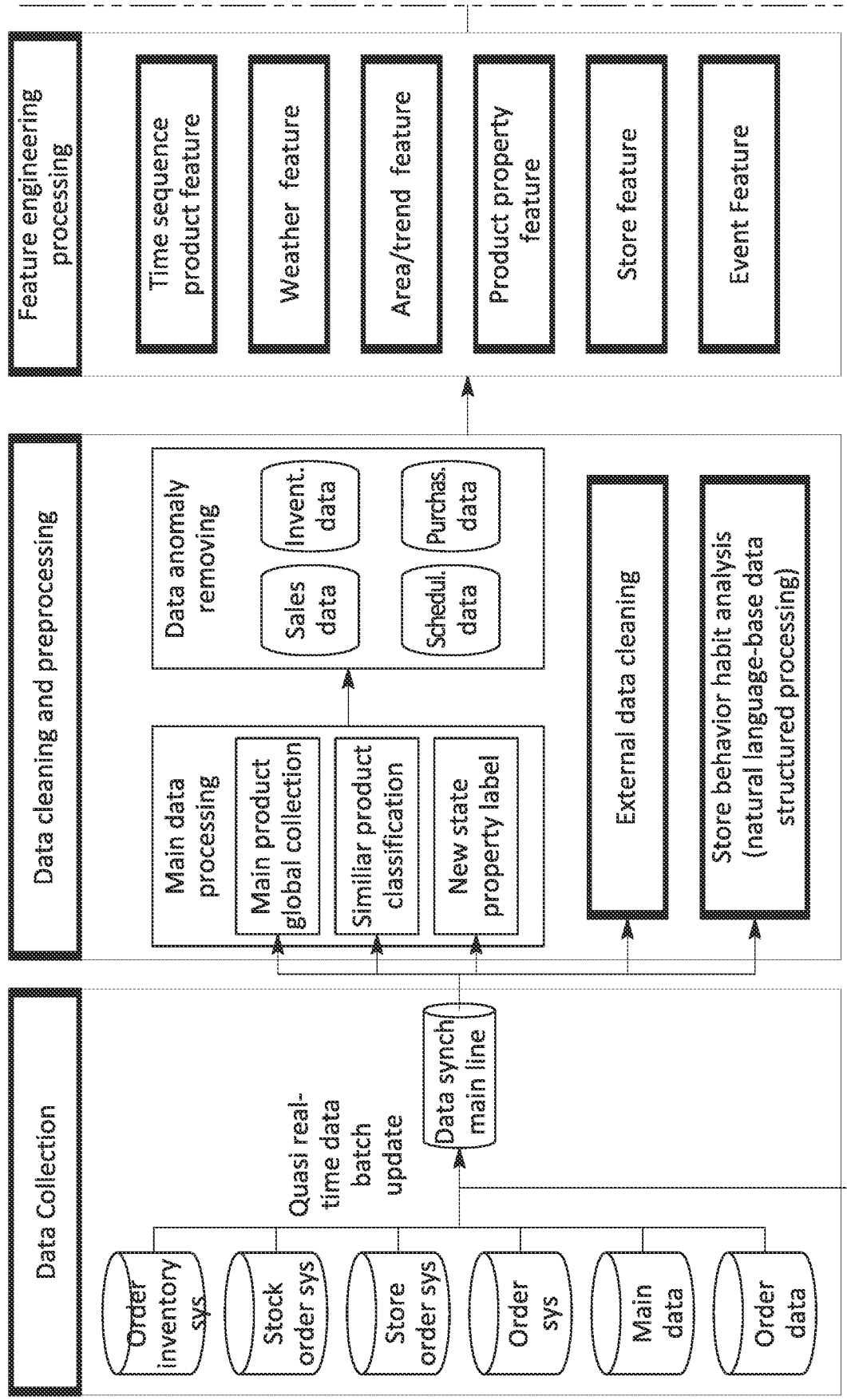
Figures 2, 5:
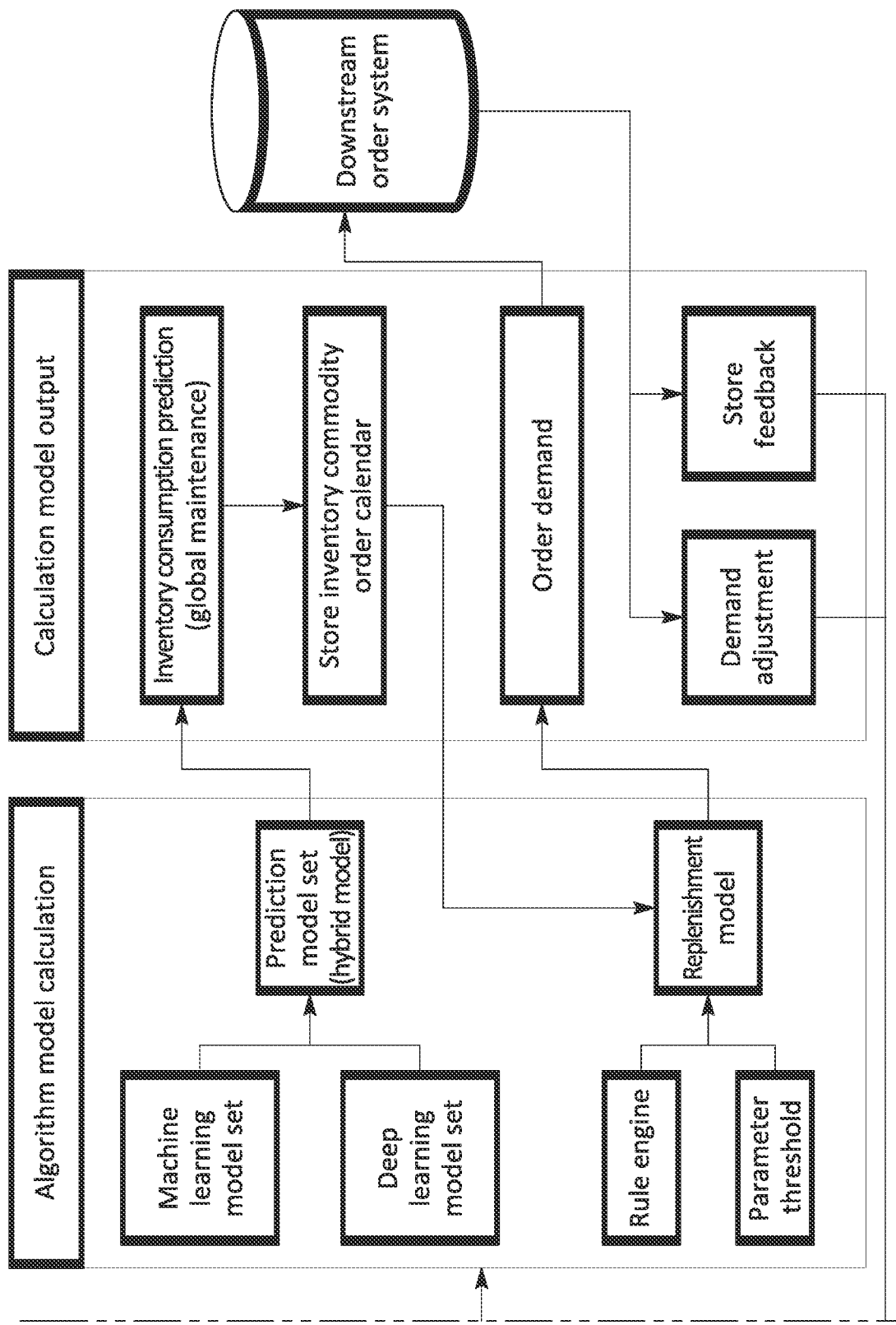

FIG. 5 (which includes FIGS. 5-1 and 5-2) shows a flowchart of a method for automatic replenishment of a retail enterprise store according to an embodiment of the present disclosure. The process of the automatic replenishment method of the present disclosure can be more clearly understood from FIG. 5. As can be seen from FIG. 5, firstly, there is a data collection stage, including the acquisition of historical operational transaction data and external data to obtain the historical operational transaction data and a plurality of pieces of external data that are contemporaneous with the historical operational transaction data; next, there is a data cleaning and preprocessing stage, including data preprocessing such as master data processing, data anomaly removing, external data cleaning, and store behavior habit analysis, etc.; then, there is a feature engineering processing stage, including feature extraction of the preprocessed data, wherein a plurality of target features can be obtained by performing data processing and feature engineering as described above on the plurality of pieces of external data; then, there is an algorithm model calculation stage, including building a prediction model (including a hybrid model), wherein the target features extracted by feature engineering are combined with the historical operational transaction data to build the prediction model on the basis of machine learning, demand prediction is performed through deep learning to obtain the predicted inventory demand of the product, and then the predicted inventory demand is inputted to a replenishment model in combination with the commodity inventory order calendar of the store; and replenishment suggestions are provided in combination with replenishment rules, wherein the replenishment rules include a rule engine and a parameter threshold set by the store. The rules engine includes replenishment business rules, which may include an order cycle and the number of days in advance of purchase, such as order calendar (that is, how many orders can be made every week), a distribution cycle (for example, ordering on Tuesday, delivering on Thursday) and other business rules to generate suggested order quantity for each purchasing window. The parameter threshold includes constraints, which may include a maximum order quantity and a minimum order quantity. As an example, the inventory consumption is predicted in accordance with the past sales history and the inventory consumption affected by special events such as coffee tasting, product expiration and the like, in combination with the weather forecast such as extremely hot or cold weather and other factors. As the algorithms for feature machine learning and deep learning, the algorithms commonly used in the prior art are used, such as decision trees, recurrent neural networks, convolutional neural networks, and the like. It should be known that, in the process of the automatic replenishment method of the present disclosure, after the replenishment suggestions are provided, the system will automatically update the historical operational transaction data and external data of the store over time. At the same time, the system will update the latest actual inventory consumption of the store, and return the updated data to the data collection stage to continuously correct the accuracy of the replenishment model. This step will be described in detail below.

In addition, in step S14, the replenishment model may, in accordance with a preset cycle, update the prediction model according to the actual inventory consumption of the at least one store, recalculate the at least four indicators and the plurality of target features, and adjust weights of the plurality of target features participating in demand prediction, wherein the adjustment is based on continuous improvement of the at least four indicators as a benchmark.

Specifically, as an example, as time elapses, the algorithm of the replenishment model may be based on the latest actual inventory sales of the store. The indicators and features are recalculated, and the weights of the feature data used in the prediction analysis are self-adjusted. The adjusted indicators are still based on the continuous improvement of the above four KPIs as a benchmark, namely: increase in prediction accuracy (1-WMAPE), decrease in days of inventory DOI, increase in demand fulfillment rate, and decrease in markout rate of inventory. The adjustment is continuously made. The preset period of adjustment is daily/weekly/quarterly, and may be set correspondingly according to different stores.

In the above method for automatic replenishment of the retail enterprise store provided by the present disclosure, a set of algorithm models can be optimized and customized according to the historical operational transaction data of the store and external environments such as weather changes, business circle customer flow, discount events and so on, so that each store can be provided with SKU-level high-precision demand prediction and replenishment suggestions to generate replenishment suggestions, improving the processing efficiency of the server, and further realizing the artificially controllable intelligent replenishment decision-making function.

Since external environmental factors will have an important impact on the accuracy of replenishment prediction, the algorithm models of the above method for automatic replenishment of the retail enterprise store provided by the present disclosure are combined with the historical operational transaction data (for example, inventory deduction generated by sales, inventory increase generated by purchasing, inventory scrap or abnormal consumption during sales, and profit and loss generated by inventorying) and the external environmental factors (for example, weather data, customer flow dynamics and/or activity events), which enriches the necessary reference factors in the replenishment process, further improving the accuracy of replenishment prediction.

In addition, in the embodiment of the present disclosure, the target range and baseline of the expected replenishment of the product are generated through the historical operational transaction data of the store, and the algorithm model uses the target range and baseline of the expected replenishment as a criteria for screening external data, so that when the external data is screened, only the external data that meet the expected indicator range is extracted as features. Therefore, both the calculation efficiency and processing speed will be in an optimal state.

In addition, in the embodiment of the present application, the problem that the replenishment demand of a single commodity cannot be accurately predicted is avoided by performing statistical calculations on the KPI matrix of the single commodity, realizing the demand prediction at the level of the single commodity, and making the replenishment prediction model more refined and accurate. In the embodiment of the present application, while predicting the replenishment demand of the single commodity and providing replenishment suggestions, the replenishment model of the commodity may be updated in real time according to the actual inventory consumption of the store, so as to continuously generate high-precision replenishment demand, which avoids the delay and inaccuracy of regular prediction of replenishment demand, further realizes continuous demand prediction and replenishment suggestions at the level of the single commodity (SKU) for each store, and further realizes the artificially controllable intelligent replenishment decision-making function.

Figure 6:
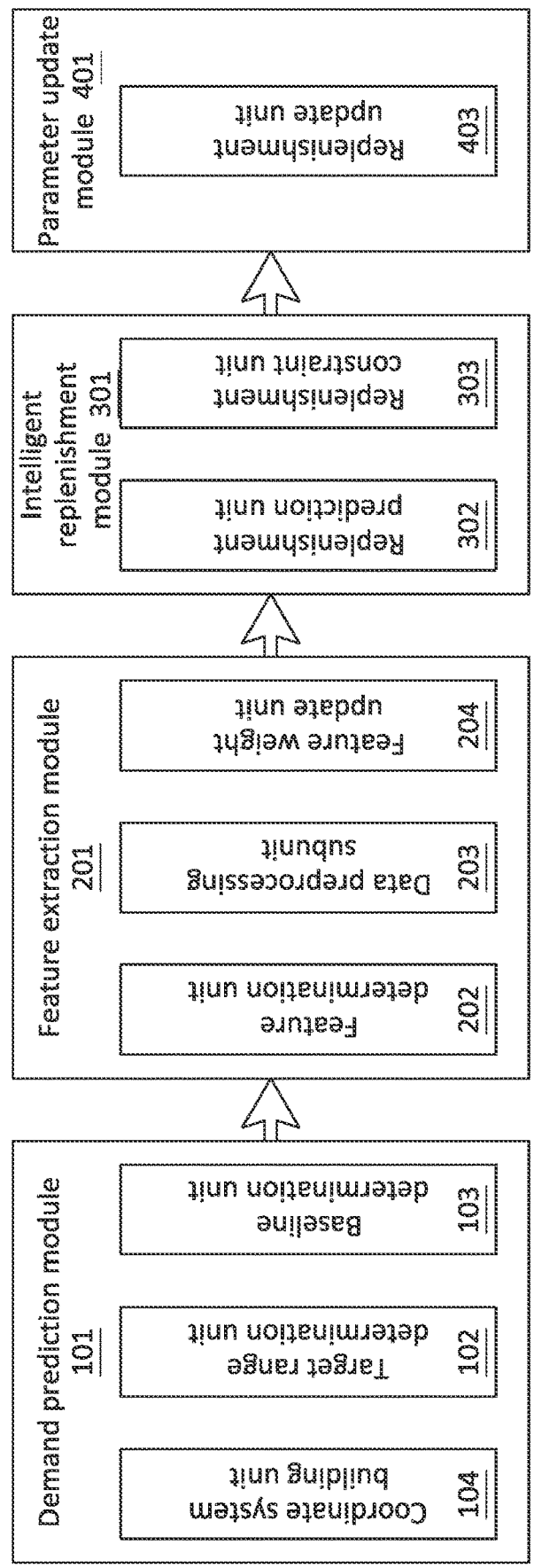
FIG. 6 is a structural block diagram of a system for automatic replenishment in a retail enterprise store according to an embodiment of the present disclosure.

A system for automatic replenishment of a retail enterprise store is further proposed in an embodiment of the present disclosure, as shown in FIG. 6. FIG. 6 shows a structural block diagram of a system for automatic replenishment of a retail enterprise store according to an embodiment of the present disclosure. The system comprises: a demand prediction module 101 configured to, according to historical operational transaction data of at least one store of the same type as the retail enterprise store, obtain an indicator matrix composed of at least four indicators of each product of the at least one store, wherein the historical operational transaction data includes at least one of inventory deduction data generated by sales, inventory increase data generated by purchasing, inventory scrap data or abnormal consumption data during sales, and profit and loss data generated by inventorying; the at least four indicators include weighted mean absolute percentage error WMAPE, days of inventory DOI, demand fulfillment rate DFR and markout rate MOR of inventory; and the demand prediction module 101 is further configured to determine an expected indicator range and a baseline of the product on the basis of the indicator matrix; a feature extraction module 201 configured to input a plurality of pieces of external data that are contemporaneous with the historical operational transaction data into a target feature extraction model, wherein the target feature extraction model extracts a plurality of target features having an impact on the indicator matrix composed of the at least four indicators on the basis of the external data and the expected indicator range; an intelligent replenishment module 301 configured to input the plurality of target features into a replenishment model in combination with the historical operational transaction data, wherein the replenishment model provides replenishment suggestions on the basis of a combination of the plurality of target features and the historical operational transaction data; and a parameter update module 401 configured to automatically adjust the indicator matrix composed of the at least four indicators over time, and to update the replenishment model.

The demand prediction module 101 further comprises: a coordinate system building unit 104 configured to form a coordinate system, the coordinate system comprising at least four coordinate axes, wherein each of the at least four coordinate axes represents one of the at least four indicators of the products; a target range determination unit 102 configured to obtain a mean value of each of the at least four indicators of the product in a plurality of stores by calculating the mean value of each of the at least four indicators of the product in each of the plurality of stores in the same time period, screen out stores with at least one of the at least four indicators of the product above the mean value from among the plurality of stores, obtain the highest value and the lowest value of the at least one indicator of the stores with the at least one indicator above the mean value, and use a range of the highest value and the lowest value of each of the at least four indicators obtained between corresponding coordinate axes of the coordinate system as the expected indicator range; and a baseline determining unit 103 configured to, for each of the at least four indicators, use a line connecting the mean values of the at least four indicators of the product of the plurality of stores obtained on the coordinate system as a baseline.

Furthermore, for calculation formulas of the four indicators of the product by the target range determination unit 102, please refer to the calculation formulas of the above method.

Further, as another embodiment of the present disclosure, the target range determination unit 102 is further configured to compare the indicator matrix of the product of the at least one store with the baseline to obtain a score of the product of the at least one store in the same time period, and obtain an indicator and an indicator distribution with the score meeting a threshold, and perform Gaussian fitting on the indicator distribution to obtain the expected indicator range. As an example, the threshold may be an indicator and an indicator distribution of stores with scores ranked in the top 20%, and for the formula used for the indicator distribution, please refer to the calculation formula of the above method.

The feature extraction module 201 further comprises a feature determination unit 202 configured to determine the inputted external data so that the indicator matrix composed of the at least four indicators falls within the expected indicator range and to extract the external data as a target feature, wherein the plurality of pieces of external data includes at least one of weather data, customer flow dynamics, and activity events, and wherein the target feature extraction model includes at least one of XGBoost, RF and LightGBM.

Further, the feature determination unit 202 further comprises a data preprocessing subunit 203 configured to obtain a plurality of primary features from the plurality of pieces of external data; perform dimensionality reduction processing on the plurality of primary features using a principal component analysis method; obtain a weight for each of the plurality of primary features; and input primary features with weights greater than a threshold among the plurality of primary features to the target feature extraction model as intermediate features.

As an example, the feature determination unit 202 further comprises a feature weight update unit 204 configured to divide the plurality of primary features into a plurality of categories, and to assign a weight to each of the plurality of primary features, wherein the more primary features of the same category, the greater the weight of the primary features of the same category.

As an example, the intelligent replenishment module 301 comprises a replenishment prediction unit 302 configured to build a prediction model according to the combination of the plurality of target features and the historical operational transaction data; obtain a predicted inventory demand from the prediction model; input the predicted inventory demand into the replenishment model; and provide the replenishment suggestions in combination with a replenishment constraint unit 303; wherein the replenishment constraint unit is configured to set replenishment business rules and restrictions.

Further, the parameter update module 401 further comprises a replenishment model update unit 403 configured to, in accordance with a preset cycle, update the prediction model according to actual inventory consumption of the at least one store; recalculate the at least four indicators and the plurality of target features; and adjust weights of the plurality of target features participating in demand prediction, wherein the adjustment is based on the continuous improvement of the at least four indicators as a benchmark.

In addition, for the implementation details and specific working processes of the above systems, please refer to the foregoing description of the implementation examples of the method, which will not be repeated here.

In the above system for automatic replenishment of the retail enterprise store provided by the present disclosure, a set of algorithm models can be optimized and customized according to the historical operational transaction data of the store and external environments such as weather changes, business circle customer flow, discount events, etc., so that each store can be provided with SKU-level high-precision demand prediction and replenishment suggestions to generate replenishment suggestions, improving the processing efficiency of the server, and further realizing the artificially controllable intelligent replenishment decision-making function.

Since external environmental factors will have an important impact on the accuracy of replenishment prediction, the algorithm models of the above system for automatic replenishment of the retail enterprise store provided by the present disclosure are combined with the historical operational transaction data (for example, inventory deduction generated by sales, inventory increase generated by purchasing, inventory scrap or abnormal consumption during sales, and profit and loss generated by inventorying) and the external environmental factors (for example, weather data, customer flow dynamics and/or activity events), which enriches the necessary reference factors in the replenishment process, further improving the accuracy of replenishment prediction.

In addition, in the embodiment of the present disclosure, the target range and baseline of the expected replenishment of the product are generated through the historical operational transaction data of the store, and the algorithm model uses the target range and baseline of the expected replenishment as a criterion for screening external data, so that when the external data is screened, only the external data that meet the expected indicator range is extracted as features. Therefore, both the calculation efficiency and processing speed will be in an optimal state.

In addition, in the embodiment of the present application, the problem that the replenishment demand of a single commodity cannot be accurately predicted is avoided by performing statistical calculations on the KPI matrix of the single commodity, realizing the demand prediction at the level of the single commodity, and making the replenishment prediction model more refined and accurate. In the embodiment of the present application, while predicting the replenishment demand of the single commodity and providing replenishment suggestions, the replenishment model of the commodity may be updated in real time according to the actual inventory consumption of the store, so as to continuously generate high-precision replenishment demand, which avoids the delay and inaccuracy of regular prediction of replenishment demand, further realizes continuous demand prediction and replenishment suggestions at the level of the single commodity (SKU) for each store, and further realizes the artificially controllable intelligent replenishment decision-making function.

Another embodiment of the present disclosure provides a computer-readable storage medium, wherein a computer program is stored on the computer-readable storage medium, and when the computer program is executed by a processor, the method for automatic replenishment as in the foregoing embodiment is implemented.

Various illustrative logical blocks, modules, units, routines, and algorithm steps described in conjunction with the embodiments disclosed herein may be implemented by electronic hardware, or by a combination of electronic hardware and executable software. To clearly illustrate this interchangeability, various illustrative components, logical blocks, modules, units, routines, and algorithm steps have been described above generally in terms of their functionality. Whether such functionality is implemented as hardware or software running on hardware depends on particular application programs and design constraints imposed on the overall system. The described functionality may be implemented in various ways for each particular application. For example, logical blocks, modules, units, routines or algorithm steps may be considered specific computer-readable instructions which, when executed by a processor, cause the processor or system to implement the described operations or functions. However, such implementation decisions should not be construed as causing a deviation from the scope of the present disclosure.

In the several embodiments provided by the present disclosure, it should be understood that the disclosed method and system may be implemented in other ways. For example, the system embodiments described above are only illustrative. For example, the division of the units is only a logical function division. In actual implementation, there may be other manners of division. For example, a plurality of units or components may be combined or integrated into another system, or some features may be ignored or not implemented. Moreover, any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

The units described as separate components may or may not be physically separated, and the components displayed as units may or may not be physical units, that is, they may be located in one place, or may be distributed to a plurality of network units. Some or all of the units may be selected according to actual needs to achieve the purpose of the solution of this embodiment.

In addition, the functional units in the embodiments of the present disclosure may be integrated into one processing unit, or each unit may exist physically separately, or two or more units may be integrated into one unit. The above integrated unit may be implemented in the form of hardware or in the form of hardware plus software functional units.

The above integrated units implemented in the form of software functional units may be stored in a computer-readable storage medium. The above software functional units are stored in a storage medium, which includes several instructions to cause a computer device (which may be a personal computer, a server, a network device or the like) or a processor to execute some of the steps of the methods described in the embodiments of the present disclosure. Moreover, the foregoing storage medium includes a U disk, a mobile hard disk, a Read-Only Memory (ROM), a Random Access Memory (RAM), a magnetic disk or an optical disk, and various media or memory, which can store program codes.

It can be clearly understood by a person skilled in the art that for convenience and brevity of description, only the division of the above functional modules is used for illustration. In practical applications, the above functional distribution can be completed by different function modules according to needs, that is, the internal structure of the system is divided into different functional modules to complete all or part of the functions described above.

In the method and system for automatic replenishment of the retail enterprise store, and the computer-readable storage medium provided by the present disclosure, a set of algorithm models can be optimized and customized according to the historical operational transaction data of the store and external environments such as weather changes, business circle customer flow, discount events and so on, so that each store can be provided with SKU-level high-precision demand prediction and replenishment suggestions to generate replenishment suggestions, improving the processing efficiency of the server, and further realizing the artificially controllable intelligent replenishment decision-making function.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

It should be noted that the above embodiments are only intended to illustrate the technical solutions of the present disclosure, and are not intended to be limiting. Although the present disclosure has been described in detail with reference to the foregoing embodiments, it should be understood by an ordinary person skilled in the art that modifications to the technical solutions set forth in the foregoing embodiments or equivalent replacements of part or all of the technical features therein are still possible. For example, the features of dependent claims may be freely replaced and/or combined as needed. However, these modifications or replacements do not cause the essence of corresponding technical solutions to deviate from the scope of the technical solutions of the embodiments of the present disclosure.

What is claimed is:

1. A computer-implemented method for automatic replenishment of a retail enterprise store, the computer-implemented method comprising:
   receiving, by data processing hardware, an indicator matrix composed of at least four indicators for a product of at least one store, the indicator matrix based on historical operational transaction data of the at least one store, wherein the historical operational transaction data includes at least one of inventory deduction data, inventory increase data, inventory scrap data, abnormal consumption data, profit data, or loss data, and wherein the at least four indicators include weighted mean absolute percentage error WMAPE, days of inventory DOI, demand fulfillment rate DFR and markout rate MOR of inventory;
   automatically adjusting, by the data processing hardware, the indicator matrix;
   determining, by the data processing hardware, for each indicator of the at least four indicators, an expected indicator range and a baseline of the product in a plurality of stores;
   providing, by the data processing hardware, external data contemporaneous with the historical operational transaction data inte to a target feature extraction model, wherein the target feature extraction model processes the external data to extract a plurality of target features that cause the indicator matrix to satisfy the expected indicator range for at least one indicator of the at least four indicators;
   providing, by the data processing hardware, the plurality of target features and the historical operational transaction data to a machine learning model trained to predict a demand for the at least one store and provide replenishment suggestions for the at least one store based on the plurality of target features and the historical operational transaction data; and
   causing, by the data processing hardware, automatic replenishment of the at least one store based on the machine learning model.

2. The computer-implemented method of claim 1, wherein the determining the expected indicator range and the baseline comprises:
   identifying a coordinate system comprising at least four coordinate axes, wherein each coordinate axis of the at least four coordinate axes represents a respective indicator of the at least four indicators;
   obtaining a respective mean value for each indicator of the at least four indicators;
   identifying the expected indicator range based on values of the at least four indicators with respect to corresponding coordinate axes of the at least four coordinate axes; and
   identifying the baseline based on the respective mean value for each indicator of the at least four indicators with respect to corresponding coordinate axes of the at least four coordinate axes.

3. The computer-implemented method of claim 2, wherein the WMAPE is
   is based on sales quantity data and weight data, wherein the MOR is
   based on scrap data wherein the DFR is based on unsold product data and demand data, and wherein the DOI is based on stock data and sales data.

4. The computer-implemented method of claim 1, wherein the determining the expected indicator range further comprises:
comparing the indicator matrix and the baseline to obtain a score of the product;
identifying_an indicator distribution based on a threshold and the score of the product; and
performing a Gaussian fitting on the indicator distribution to obtain the expected indicator range.

5. The computer-implemented method of claim 4, wherein the performing the aussian fitting is based on a corresponding distribution equation.

6. The computer-implemented method of claim 1, further comprising:
determining, by the target feature extraction model, at least a portion of the external data that causes the indicator matrix to satisfy the expected indicator range for at least one indicator of the at least four indicators; and
extracting, by the target feature extraction model, the at least a portion of the external data as a target feature of the plurality of target features,
wherein the external data comprises at least one of weather data, customer flow dynamics data, or events data, and
wherein the target feature extraction model comprise at least one of XGBoost, RF, or LightGBM.

7. The computer-implemented method of claim 1, further comprising:
identifying a plurality of features;
each of identifying one or more weights associated with the plurality of features; and
identifying at least a portion of the plurality of features associated with a respective weight of the one or more weights that satisfies a threshold,
wherein the providing the external data to the target feature extraction model comprises:
providing the at least a portion of the plurality of features to the target feature extraction model.

8. The computer-implemented method of claim 7, wherein the identifying the one or more weights comprises:
identifying a plurality of categories associated with the plurality of features; and
assigning a respective weight to each of the plurality of features based on the plurality of categories.

9. The computer-implemented method of claim 1, further comprising:
building the machine learning model.

10. The computer-implemented method of claim 1, further comprising:
updating the machine learning model according to inventory consumption data associated with the at least one store to obtain an updated machine learning model;
determining one or more of an updated indicator or an updated target feature;
determining one or more weights associated with the plurality of target features; and
providing the one or more of the updated indicator or the updated target feature and the one or more weights to the updated machine learning model.

11. A system for automatic replenishment of a retail enterprise store, the system comprising:
memory storing computer-executable instructions; and
a processor in communication with the memory, wherein execution of the computer-executable instructions by the processor causes the processor to:
receive an indicator matrix composed of at least four indicators for a product of at least one store, the indicator matrix based on historical operational transaction data of the at least one store, wherein the historical operational transaction data includes at least one of inventory deduction data, inventory increase data-generated by purchasing, inventory scrap data, abnormal consumption data, profit data, or loss data, and wherein the at least four indicators include weighted mean absolute percentage error WMAPE, days of inventory DOI, demand fulfillment rate DFR and markout rate MOR of inventory;
automatically adjust the indicator matrix;
determine, for each indicator of the at least four indicators, an expected indicator range and a baseline of the product in a plurality of stores;
provide external data contemporaneous with the historical operational transaction data to a target feature extraction model, wherein the target feature extraction model processes the external data to extract a plurality of target features that cause the indicator matrix to satisfy the expected indicator range for at least one indicator of the at least four indicators;
provide the plurality of target features and the historical operational transaction data to a machine learning model trained to predict a demand for the at least one store and provide replenishment suggestions for the at least one store based on the plurality of target features and the historical operational transaction data; and
cause automatic replenishment of the at least one store based on the machine learning model.

12. The system of claim 11, wherein to determine the expected indicator range and the baseline, the execution of the computer-executable instructions by the processor further causes the processor to:
identify a coordinate system, comprising at least four coordinate axes, wherein each coordinate axis of the at least four coordinate axes represents a respective indicator of the at least four indicators;
obtain a respective mean value for each indicator of the at least four indicators;
identify the expected indicator range based on values of the at least four indicators with respect to corresponding coordinate axes of the at least four coordinate axes; and
identify the baseline based on the respective mean value for each indicator of the at least four indicators with respect to corresponding coordinate axes of the at least four coordinate axes.

13. The system according to claim 12, wherein
the WMAPE is:
based on sales quantity data and weight data, wherein the MOR is based on scrap data, wherein the DFR is based on unsold product data and demand data, and wherein the DOI is based on stock data and sales data.

14. The system of claim 11, wherein to determine the expected indicator range, the execution of the computer-executable instructions by the processor further causes the processor to:
compare the indicator matrix and the baseline to obtain a score of the product;
identify an indicator distribution based on a threshold and the score of the product; and
perform a Gaussian fitting on the indicator distribution to obtain the expected indicator range.

15. The system of claim 14, wherein to perform the Gaussian fitting, the execution of the computer-executable instructions by the processor further causes the processor to perform the Gaussian fitting based on a corresponding distribution equation.

16. The system of claim 11, wherein the execution of the computer-executable instructions by the processor further causes the processor to:
determine, by the target feature extraction model, at least a portion of the external data that causes the indicator matrix to satisfy the expected indicator range for at least one indicator of the at least four indicators; and
extract, by the target feature extraction model, the at least a portion of the external data as a target feature of the plurality of target features,
wherein the external data comprises at least one of weather data, customer flow dynamics data, or events data, and
wherein the target feature extraction model comprises at least one of XGBoost, RF, or LightGBM.

17. The system of claim 11, wherein the execution of the computer-executable instructions by the processor further causes the processor to:
identify a plurality of features;
identify one or more weights associated with the plurality of features; and
identify at least a portion of the plurality of features associated with a respective weight of the one or more weights that satisfies a threshold,
wherein to provide the external data to the target feature extraction model, the execution of the computer-executable instructions by the processor further causes the processor to:
provide the at least a portion of the plurality of features to the target feature extraction model.

18. The system of claim 17, wherein to identify the one or more weights, the execution of the computer-executable instructions by the processor further causes the processor to:
identify a plurality of categories associated with the plurality of features; and
assign a respective weight to each of the plurality of features based on the plurality of categories.

19. The system of claim 11, wherein the execution of the computer-executable instructions by the processor further causes the processor to:
build the machine learning model.

20. The system of claim 11, wherein the execution of the computer-executable instructions by the processor further causes the processor to:
update the machine learning model according to inventory consumption data associated with the at least one store to obtain an updated machine learning model;
determine one or more of an updated indicator or an updated target feature;
determine one or more weights associated with the plurality of target features; and
provide the one or more of the updated indicator or the updated target feature and the one or more weights to the updated machine learning model.

* * * * *